US012812218B2

(12) United States Patent
Shu et al.

(10) Patent No.: US 12,812,218 B2
(45) Date of Patent: Nov. 24, 2026

(54) VIDEO PLAYING METHOD, APPARATUS AND DEVICE, AND STORAGE MEDIUM

(71) Applicant: Beijing Zitiao Network Technology Co., Ltd., Beijing (CN)

(72) Inventors: Xiaofeng Shu, Beijing (CN); Youjia Shen, Beijing (CN); Yaping Li, Beijing (CN); Chenqu Gu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 24 days.

(21) Appl. No.: 18/877,502

(22) PCT Filed: Jun. 21, 2023

(86) PCT No.: PCT/CN2023/101550
§ 371 (c)(1),
(2) Date: Dec. 20, 2024

(87) PCT Pub. No.: WO2023/246823
PCT Pub. Date: Dec. 28, 2023

(65) Prior Publication Data

US 2025/0392791 A1 Dec. 25, 2025

(30) Foreign Application Priority Data

Jun. 22, 2022 (CN) ........................ 202210712520.X

(51) Int. Cl.
*H04N 21/485* (2011.01)
*H04N 21/2368* (2011.01)
(Continued)

(52) U.S. Cl.
CPC ..... *H04N 21/4852* (2013.01); *H04N 21/2368* (2013.01); *H04N 21/439* (2013.01); *H04N 21/4666* (2013.01)

(58) Field of Classification Search
CPC ........... H04N 21/4852; H04N 21/2368; H04N 21/439; H04N 21/4666; H04N 21/44;
(Continued)

(56) References Cited

U.S. PATENT DOCUMENTS

2007/0027682 A1 2/2007 Bennett
2014/0067388 A1* 3/2014 Manikandan ........... G10L 15/20 704/233
(Continued)

FOREIGN PATENT DOCUMENTS

CN 108449502 A 8/2018
CN 109584897 A 4/2019
(Continued)

OTHER PUBLICATIONS

International Search Report and Written Opinion for International Application No. PCT/CN2023/101550, mailed on Sep. 14, 2023, 17 pages.
(Continued)

*Primary Examiner* — Fernando Alcon
(74) *Attorney, Agent, or Firm* — Astute IP Law Group

(57) ABSTRACT

Provided in the present disclosure are a video playing method, apparatus and device, and a storage medium. The method comprises: firstly, in response to a trigger operation for a preset background-sound weakening control, starting a preset background-sound weakening mode; then, triggering background-sound weakening processing on at least one original video in response to turning on of the preset background-sound weakening mode, acquiring a target video corresponding to the original video on the basis of background-sound weakening processing; and finally, playing the target video on the basis of background-sound weakening-result audio data.

20 Claims, 6 Drawing Sheets

(51) Int. Cl.
*H04N 21/439* (2011.01)
*H04N 21/466* (2011.01)

(58) Field of Classification Search
CPC ........ H04N 21/472; G06N 3/08; G10L 25/30; G10L 25/57
See application file for complete search history.

(56) References Cited

U.S. PATENT DOCUMENTS

| | | | | |
|---|---|---|---|---|
| 2014/0355776 | A1* | 12/2014 | Park | G10L 21/0208 381/71.2 |
| 2016/0148623 | A1* | 5/2016 | Yamanashi | G10L 21/028 725/116 |
| 2016/0163330 | A1 | 6/2016 | Ida | |
| 2016/0180861 | A1 | 6/2016 | Masuda | |
| 2019/0179600 | A1 | 6/2019 | An | |
| 2020/0358415 | A1* | 11/2020 | Aoyama | H04S 7/302 |
| 2021/0074266 | A1* | 3/2021 | Lu | G10L 19/005 |
| 2022/0076692 | A1* | 3/2022 | Deng | G06F 3/165 |
| 2022/0101869 | A1* | 3/2022 | Wichern | G10L 21/028 |
| 2022/0246146 | A1* | 8/2022 | Nouri | G06N 3/0442 |
| 2023/0162754 | A1* | 5/2023 | Yeh | G10L 21/0364 704/202 |
| 2023/0238016 | A1* | 7/2023 | Schindler | G10L 21/0364 704/278 |
| 2024/0022864 | A1* | 1/2024 | Zheng | H04R 25/453 |
| 2024/0089541 | A1* | 3/2024 | Sun | H04N 21/4852 |
| 2024/0155289 | A1* | 5/2024 | Shuang | G10L 21/0364 |
| 2024/0296821 | A1* | 9/2024 | Joshi | G10K 11/1754 |
| 2024/0406654 | A1* | 12/2024 | Born | H04R 5/027 |

FOREIGN PATENT DOCUMENTS

| | | | |
|---|---|---|---|
| CN | 110097888 | A | 8/2019 |
| CN | 110491407 | A | 11/2019 |
| CN | 110503976 | A | 11/2019 |
| CN | 110602553 | A | 12/2019 |
| CN | 111508519 | A | 8/2020 |
| CN | 113611324 | A | 11/2021 |
| CN | 114333796 | A | 4/2022 |
| CN | 114466242 | A | 5/2022 |
| CN | 115278352 | A | 11/2022 |

OTHER PUBLICATIONS

Office Action for Chinese Patent Application No. 202210712520.X, mailed on Jul. 25, 2023, 24 pages.

* cited by examiner

VIDEO PLAYING METHOD, APPARATUS AND DEVICE, AND STORAGE MEDIUM

CROSS-REFERENCE TO RELATED APPLICATIONS

The present application is a national phase application of PCT/CN2023/101550 filed Jun. 21, 2023, which claims priority to and is based on a Chinese application with an application No. 202210712520.X and a filing date of Jun. 22, 2022, the aforementioned applications are hereby incorporated by reference in their entireties.

FIELD OF THE INVENTION

The present disclosure relates to the field of data processing, and in particular to a video playing method, apparatus, device and storage medium.

BACKGROUND

With the popularization of the Internet and smart terminals, media contents such as videos have become one of the main ways for people to entertain themselves in their daily lives, during people view media contents, in addition to human voices, there are usually background sounds such as environmental sounds, background music, etc., and the background sound is too loud, which affects people's experience of viewing video contents.

DISCLOSURE OF THE INVENTION

The embodiment of the present disclosure provides a video playing method.

In a first aspect, the present disclosure provides a video playing method, appliable on a client side, the method including:

in response to a trigger operation on a preset background sound softening control, starting a preset background sound softening mode;

in response to starting of the preset background sound softening mode, triggering a background sound softening process for at least one original video, and acquiring a target video corresponding to the original video based on the background sound softening process; wherein the target video includes background sound softening-result audio data, and the background sound softening-result audio data is obtained by processing original audio data of the original video based on a trained background sound softening model; and playing the target video based on the background sound softening-result audio data.

In an optional implementation, in response to a trigger operation on a preset background sound softening control, starting a preset background sound softening mode, may include:

in response to a triggering operation on a preset background sound softening control on a video playing setting interface, starting a preset background sound softening mode.

In an optional implementation, before in response to a triggering operation on a preset background sound softening control on a video playing setting interface, starting a preset background sound softening mode, the method may further include:

displaying a background sound softening mode guide window on the video playing interface; wherein a mode starting control is disposed on the background sound softening mode guide window;

in response to a trigger operation on the mode starting control, displaying a video playing setting interface: wherein a preset background sound softening control is disposed on the video playing setting interface.

In an optional implementation, in response to a trigger operation on a preset background sound softening control, starting a preset background sound softening mode, may include:

in response to a triggering operation on a preset background sound softening control on a playing interface for the first video, starting a preset background sound softening mode.

In an optional implementation, in response to a triggering operation on a preset background sound softening control on a playing interface for the first video, starting a preset background sound softening mode, may include:

in response to a triggering operation on a preset background sound softening control on a playing interface for the first video in a clear screen state, starting a preset background sound softening mode.

In an optional implementation, before in response to a trigger operation on a preset background sound softening control, starting a preset background sound softening mode, the method may further include:

receiving a softening degree adjustment operation on a preset softening adjustment control, and determining a softening degree adjustment result based on the softening degree adjustment operation:

Correspondingly, in response to a trigger operation on a preset background sound softening control, starting a preset background sound softening mode, may include:

in response to a triggering operation on a preset background sound softening control, starting a preset background sound softening mode based on the softening degree adjustment result.

In a second aspect, the present disclosure provides a video playing method, appliable on a server side, the method may include:

acquiring an original video;

inputting original audio data of the original video into a trained background sound softening model, and through a background sound softening processing by the background sound softening model, outputting processing result data;

determining background sound softening-result audio data corresponding to the original audio data, based on the processing result data;

generating a target video corresponding to the original video based on the background sound softening-result audio data.

In an optional implementation, before determining the background sound softening-result audio data corresponding to the original audio data, based on the processing result data, the method further includes:

mixing the processing result data with the original audio data of the original video in accordance with a preset first ratio, to obtain first mixing result audio data:

Correspondingly, the determining background sound softening-result audio data corresponding to the original audio data, based on the processing result data, may include:

determining the first mixing result audio data as the background sound softening-result audio data corresponding to the original audio data.

In an optional implementation, before the determining background sound softening-result audio data corresponding to the original audio data, based on the processing result data, the method further includes:

based on the original audio data of the original video and the processing result data, acquiring background audio data in the original audio data;

mixing the processing result data with the background audio data in accordance with a preset second ratio to obtain second mixing result audio data:

Correspondingly, the determining background sound softening-result audio data corresponding to the original audio data, based on the processing result data, may include:

determining the second mixing result audio data as the background sound softening-result audio data corresponding to the original audio data.

In an optional implementation, after the inputting original audio data of the original video into a trained background sound softening model, and through a background sound softening processing by the background sound softening model, outputting the processing result data, the method may further include:

determining an energy ratio between the processing result data and the original audio data of the original video;

in response to the energy ratio being greater than a preset third ratio, determining the original audio data of the original video as the background sound softening-result audio data:

Correspondingly, the determining the background sound softening-result audio data corresponding to the original audio data based on the processing result data may include:

in response to the energy ratio being not greater than the preset third ratio, determining the processing result data as the background sound softening-result audio data corresponding to the original audio data.

In an optional implementation, after the inputting audio data of the target video into a trained background sound softening model, and through a background sound softening processing by the background sound softening model, outputting the processing result data, the method may further include:

determining background audio data in the original audio data, based on the processing result data and the original audio data of the original video;

determining whether an energy value of the background audio data is less than a preset energy threshold;

in response to the energy value being less than the preset energy threshold, then determining the original audio data of the original video as the background sound softening-result audio data corresponding to the original audio data:

Correspondingly, the determining the background sound softening-result audio data corresponding to the original audio data based on the processing result data may include:

in response to the energy value being not less than the preset energy threshold, determining the processing result data as the background sound softening-result audio data corresponding to the original audio data.

In a third aspect, the present disclosure provides a method for training a background sound softening model, the method comprising:

acquiring training sample data and training target data having a corresponding relationship: wherein the training sample data can be obtained by mixing pre-collected vocal audio data and background audio data in different ratios, the background audio data includes background environmental audio data and/or background music data, and the training target data is the vocal audio data in the training sample data;

training a pre-constructed fully connected convolutional neural network CNN model by using the training sample data and training target data having the corresponding relationship, to obtain a trained background sound softening model.

In a fourth aspect, the present disclosure provides a video playing apparatus, appliable on a client side, and the apparatus includes:

a starting module configured to, in response to a trigger operation on a preset background sound softening control, start a preset background sound softening mode;

a first acquisition module configured to, in response to starting of the preset background sound softening mode, trigger a background sound softening process for at least one original video, and acquire a target video corresponding to the original video based on the background sound softening process; wherein the target video includes background sound softening-result audio data, and the background sound softening-result audio data is obtained by processing original audio data of the original video based on a trained background sound softening model; and a playing module configured to play the target video based on the background sound softening-result audio data.

In a fifth aspect, the present disclosure provides a video playing apparatus, appliable on a server side, and the apparatus includes:

a second acquisition module configured to acquire an original video;

an output module configured to input original audio data of the original video into a trained background sound softening model, and through a background sound softening processing by the background sound softening model, output processing result data;

a second determination module configured to determine background sound softening-result audio data corresponding to the original audio data, based on the processing result data;

a generation module configured to generate a target video corresponding to the original video based on the background sound softening-result audio data.

In a sixth aspect, the present disclosure provides an apparatus of training a background sound softening model, wherein the apparatus includes:

a fourth acquisition module configured to acquire training sample data and training target data having a corresponding relationship: wherein the training sample data can be obtained by mixing pre-collected vocal audio data and background audio data in different ratios, the background audio data includes background environmental audio data and/or background music data, and the training target data is the vocal audio data in the training sample data;

a training module configured to train a pre-constructed fully connected convolutional neural network CNN model by using the training sample data and training target data having the corresponding relationship, to obtain a trained background sound softening model.

In a seventh aspect, the present disclosure provides a computer-readable storage medium having instructions stored thereon, which, when executed on a terminal device, causes the terminal device to implement the method as described above.

In an eighth aspect, the present disclosure provides a video playing device, including a memory, a processor, and computer programs stored on the memory and executable on the processor, where the processor, when executing the computer programs, implements the method as described above.

In a ninth aspect, the present disclosure provides a computer program product, which includes computer programs/instructions, which, when executed by a processor, causes the methods as described above to be implemented.

The embodiments of the present disclosure provide a video playing method, which first in response to a trigger operation on a preset background sound softening control, starting a preset background sound softening mode; then in response to starting of the preset background sound softening mode, triggering a background sound softening process for at least one original video, and acquiring a target video corresponding to the original video based on the background sound softening process; wherein the target video includes background sound softening-result audio data, and the background sound softening-result audio data is obtained by processing original audio data of the original video based on a trained background sound softening model; and then playing the target video based on the background sound softening-result audio data.

DESCRIPTION OF THE DRAWINGS

The accompanying drawings, which are incorporated in and constitute a part of this specification, illustrate embodiments according to the present disclosure, and together with the description, serve to explain the principles of the present disclosure.

In order to more clearly illustrate the technical solutions in the embodiments of the present disclosure or related technologies, the drawings required for use in the embodiments or related technical descriptions are briefly introduced below, and it is obvious for ordinary skilled in the art that other drawings can be derived based on these drawings without paying any creative labor.

DETAILED DESCRIPTION OF PREFERRED EMBODIMENTS

In order to more clearly understand the above features of the present disclosure, the scheme of the present disclosure will be further described below. It should be noted that, in the absence of conflict, the embodiments of the present disclosure and the features therein may be combined with each other.

In the following description, many specific details are set forth to facilitate a full understanding of the present disclosure, but the present disclosure may also be implemented in other ways different from those described herein: it is obvious that the embodiments in the specification are only part of the embodiments of the present disclosure, rather than all of the embodiments.

With the popularization of the Internet and smart terminals, media contents such as videos have become one of the main ways for people to entertain themselves in their daily lives, during people view media contents, in addition to human voices, there are usually background sounds such as environmental sounds, background music, etc., and the background sound is too loud, which affects people's experience of viewing video contents.

Therefore, how to improve people's video viewing experience is a technical problem that needs to be solved.

To this end, the present disclosure provides a video playing method, which first in response to a trigger operation on a preset background sound softening control, starting a preset background sound softening mode; then in response to starting of the preset background sound softening mode, triggering a background sound softening process for at least one original video, and acquiring a target video corresponding to the original video based on the background sound softening process; wherein the target video includes background sound softening-result audio data, and the background sound softening-result audio data is obtained by processing original audio data of the original video based on a trained background sound softening model; and then playing the target video based on the background sound softening-result audio data. The present disclosure can enter a preset background sound softening mode by a user triggering a preset background sound softening control, in this mode, the original audio data of the original video is processed to obtain background sound softened video data, and then the target video is played based on the background sound softened video data, so that the intensity of the background sound can be changed at any time according to the user's needs, thereby solving the problem of people's video viewing experience being affected due to excessive background sound.

Figure 1:
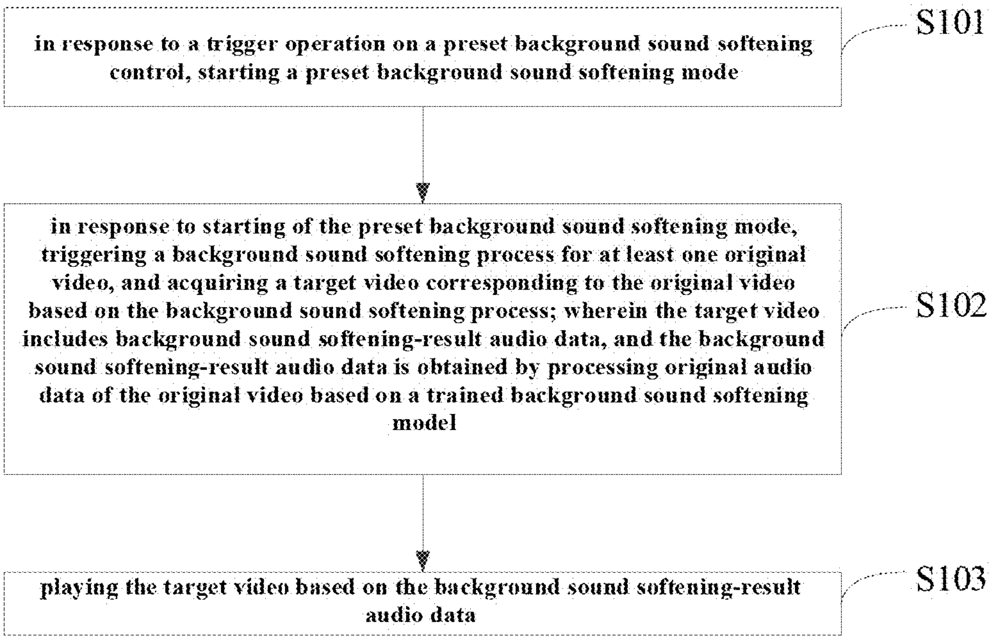
FIG. 1 is a flow chart of a video playing method provided by an embodiment of the present disclosure.

Based on this, an embodiment of the present disclosure provides a video playing method. Referring to FIG. 1, which is a flowchart of a video playing method provided by an embodiment of the present disclosure, the method is applicable to a client, and the method may include:

S101: in response to a trigger operation on a preset background sound softening control, starting a preset background sound softening mode:

Among them, the client can be a mobile terminal such as a smart phone, a personal digital assistant (PDA), a tablet personal computer (Tablet PC), a PMP (portable multimedia player), a vehicle terminal (such as a vehicle navigation terminal), a wearable device, a laptop computer, etc., as well as a fixed terminal such as a digital television, a desktop computer, a smart home device, etc.

The preset background sound softening control is used to adjust ON/OFF state of the preset background sound softening mode.

The preset background sound softening mode refers to a mode for softening the background sound in the video being played.

Specifically, there are various ways to trigger the preset background sound softening mode, in an optional implementation, a preset background sound softening control is displayed on the video playing setting interface, a user can trigger to start the preset background sound softening mode by clicking the preset background sound softening control. Specifically, in response to a triggering operation on a preset background sound softening control on a video playing setting interface, the preset background sound softening mode can be started.

Figure 2:
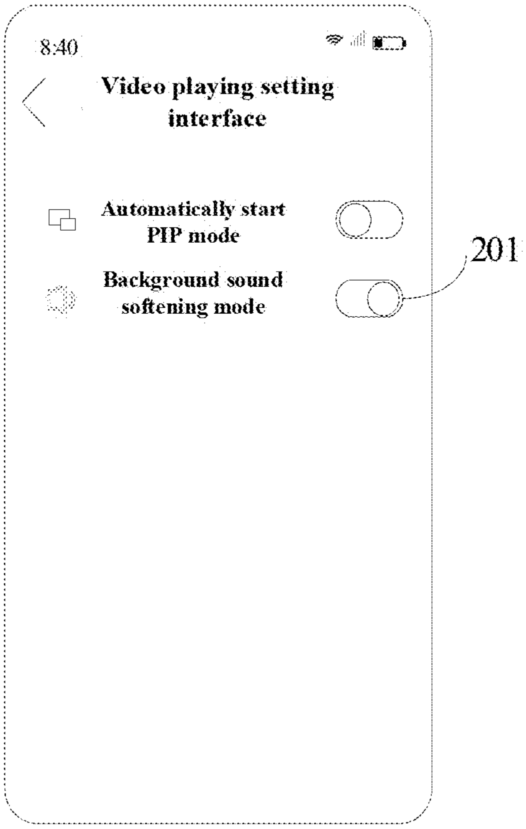
FIG. 2 is a schematic diagram of a video playing setting interface provided by an embodiment of the present disclosure.

In an application scenario, before or during viewing a video, a user can click on a video playing setting control to display a video playing setting interface, and set a background sound softening mode on the video playing setting interface. As shown in FIG. 2 which is a schematic diagram of a video playing setting interface provided by an embodiment of the present disclosure, and a preset background sound softening control 201 is provided on the video playing setting interface, the user can click on the control to trigger the preset background sound softening mode to be started.

In order to enrich the user experience, before receiving the trigger operation on the preset background sound softening control and starting the preset background sound softening mode, a softening degree for the preset background sound can also be adjusted. Specifically, it is possible to receive a softening degree adjustment operation on the preset softening adjustment control, and determine the softening degree adjustment result based on the softening degree adjustment operation, in response to the trigger operation on the preset background sound softening control, start the preset background sound softening mode based on the softening degree adjustment result.

Among them, the preset softening adjustment control is used to adjust the softening degree for the preset background sound.

Figure 3:
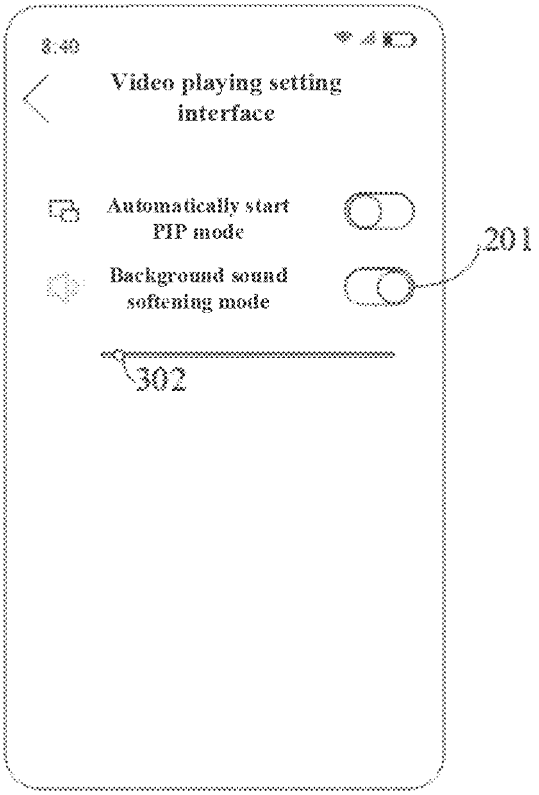
FIG. 3 is a schematic diagram of another video playing setting interface provided by an embodiment of the present disclosure.

As shown in FIG. 3, a preset softening adjustment control 302 is disposed on the video playing setting interface, the user can adjust the softening degree for the preset background sound by dragging the control, for example, when the user drags the preset softening adjustment control to the far left, the softening degree adjustment result is that the preset background sound is 0, upon receiving the trigger operation on the preset background sound softening control, the preset background sound softening mode can be started based on the softening degree adjustment result.

In another application scenario, since the user has no way of knowing existence of the background sound softening mode during viewing a video, a background sound softening mode guide window can be displayed on the video playing interface to guide the user to enter the video playing setting interface, thereby triggering to start the background sound softening mode. Among them, a mode starting control can be disposed on the background sound softening mode guide window, in response to the trigger operation on the mode starting control, the video playing setting interface can be displayed, in response to the trigger operation on the preset background sound softening control on the video playing setting interface, the preset background sound softening mode can be started.

Among them, the background sound softening mode guide window can be used to prompt the user that the background sound softening mode can be started.

In an embodiment of the present disclosure, during a user views a video, a background sound softening mode guide window can be displayed on the video playing interface, upon receiving the trigger operation on the mode starting control, the video playing setting interface can be displayed, upon receiving the trigger operation on the preset background sound softening control on the video playing setting interface, the preset background sound softening mode can be started.

Figure 4:
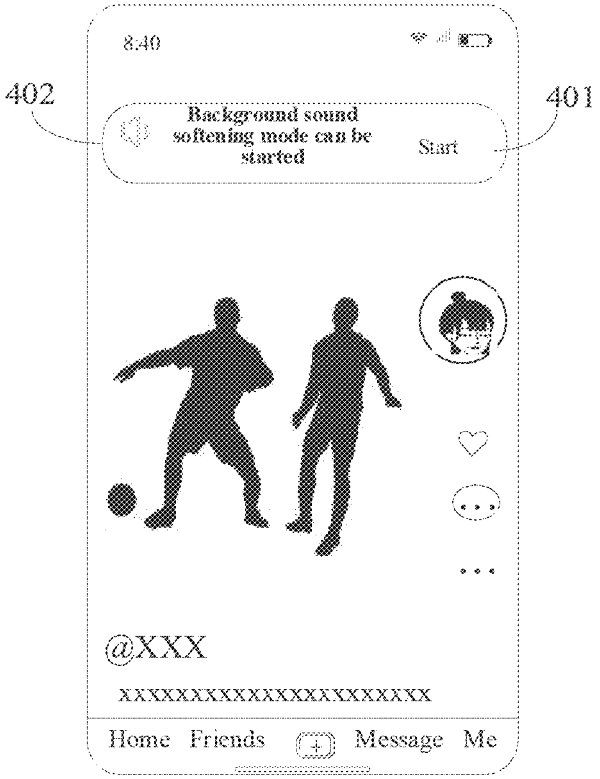
FIG. 4 is a schematic diagram of a video playing interface provided by an embodiment of the present disclosure.

As shown in FIG. 4, which is a schematic diagram of a video playing interface provided by an embodiment of the present disclosure, wherein a background sound softening module guide window 402 is illustrated, prompting the user that the background sound softening mode can be started, when the user clicks the mode starting control 401, the video playing setting interface is triggered to display, as shown in FIG. 2, a preset background sound softening control 201 is disposed on the video playing setting interface, when the user clicks the control, the background sound softening mode is triggered to be started.

In another application scenario, in order to help a user set the background sound softening mode for a currently playing video when the user viewing the video, a preset background sound softening control can be disposed on the playing interface of the first video, the user can trigger to start the preset background sound softening mode by clicking the preset background sound softening control, specifically, the preset background sound softening mode can be started in response to the triggering operation on the preset background sound softening control on the playing interface of the first video.

Among them, the first video may be any video viewed by the user, which is not specifically limited in the present disclosure.

In an embodiment of the present disclosure, when a trigger operation on a preset background sound softening control on a playing interface of a first video is received, a preset background sound softening mode is started.

Figure 5:
FIG. 5 is a schematic diagram of another video playing interface provided by an embodiment of the present disclosure.

For case of understanding, refer to FIG. 5, which is a schematic diagram of another video playing interface provided by an embodiment of the present disclosure. As shown in FIG. 5, a preset background sound softening control 501 is illustrated, when the user triggers the control, the preset background sound softening mode is started.

It should be noted that the present disclosure does not impose any limitation on the display position of the preset background sound softening control.

In addition, the above-mentioned application scenario is also applicable to a playing interface in a clear screen state, for example, a preset background sound softening control can be disposed on the playing interface of the first video in the clear screen state, the user can trigger to start the preset background sound softening mode by clicking the preset background sound softening control, specifically, the preset background sound softening mode can be started, in response to the triggering operation on the preset background sound softening control on the playing interface of the first video in the clear screen state.

Among them, the first video may be any video viewed by the user, which is not specifically limited in the present disclosure.

The playing interface of the first video in a clear screen state refers to an interface in which only video playing contents are displayed, in order to reduce the impact of information displayed on the video playing interface other than the video contents on the user's video viewing experience during the user views the video.

In an embodiment of the present disclosure, when a trigger operation on a preset background sound softening control on a playing interface of the first video in a clear screen state is received, the preset background sound softening mode is started.

Figure 6:
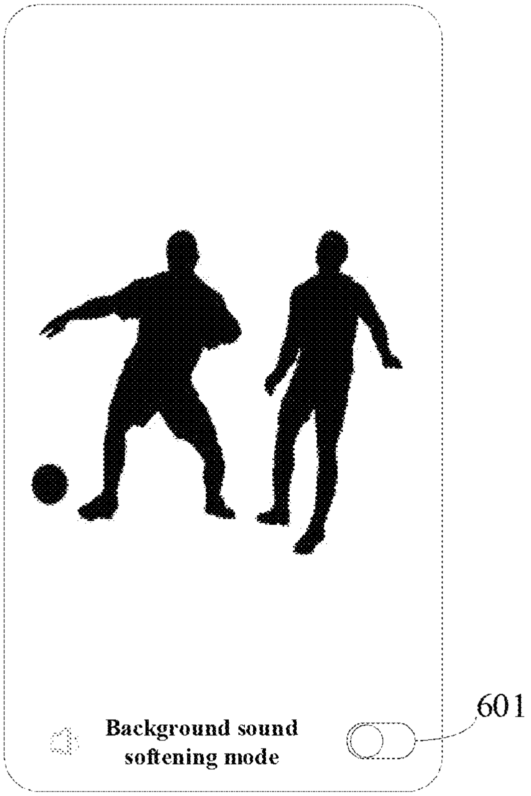
FIG. 6 is a schematic diagram of a clear screen interface provided in an embodiment of the present disclosure.

For ease of understanding, with reference to FIG. 6, which is a schematic diagram of a clear screen interface provided by an embodiment of the present disclosure, as shown in FIG. 6, a first video is displayed, and a preset background sound softening control 601 is illustrated, when the user triggers the control, the preset background sound softening mode is started.

In an actual application, if the user triggers to start the preset background sound softening mode for the currently playing video, the preset background sound softening mode would keep started when the user views subsequent videos, and only when the user disable the preset background sound softening mode, the preset background sound softening mode would be exited.

It should be noted that after the preset background sound softening mode is started, the user can disable the preset background sound softening mode by triggering the preset background sound softening control again, and the present disclosure does not impose any limitation on the specific triggering method.

S102: in response to starting of the preset background sound softening mode, triggering a background sound softening process for at least one original video, and acquiring a target video corresponding to the original video based on the background sound softening process;

wherein the target video includes background sound softening-result audio data, and the background sound softening-result audio data is obtained by processing original audio data of the original video based on a trained background sound softening model.

In an optional implementation, a trained background sound softening model can be pre-deployed on the client side, taking any one of the at least one original video as an example, when the preset background sound softening mode is started, the original video can be input into the trained background sound softening model for processing, so as to obtain the target video corresponding to the original video.

In another optional implementation, the trained background sound softening model can also be deployed on the server side, taking any one of the at least one original video as an example, when starting of preset background sound softening mode is received, the client can send an original video carrying a background sound softening identifier to the server, and upon receiving the original video request carrying the background sound softening identifier sent from the client, the server can obtain the corresponding original video according to the identifier, and then input the original video into the trained background sound softening model for processing, obtains a target video corresponding to the original video and sends it to the client.

In an actual application, the server can pre-process the original audio data of each original video to soften the background sound, that is, the server can store the original audio data of each original video and the processing result data after the background sound softening for each original video, so that when starting of the preset background sound softening mode is received, the server can directly return the target video corresponding to the original video, thereby improving the response speed of the client.

It should be noted that a training process for the background sound softening model may be the same as that described in a training method for the background sound softening model hereinafter, specifically referring to the description of the training method for the background sound softening model hereinafter, which will not be repeated here in the present disclosure.

In an embodiment of the present disclosure, a target video corresponding to an original video refers to a video containing only vocal audio data obtained after original audio data of the original video is processed by the trained background sound softening model.

In an embodiment of the present disclosure, upon receiving a trigger operation from the user for a preset background sound softening control, the preset background sound softening mode can be started, in the preset background sound softening mode, the background sound softening processing for at least one original video can be triggered, and the target video corresponding to the original video can be obtained based on the background sound softening processing.

S103: playing the target video based on the background sound softening-result audio data.

In an embodiment of the present disclosure, when the target video corresponding to the original video is received, the target video can be played based on the background sound softening-result audio data.

In order to meet users' different video viewing requirements, some background sounds can be mixed in without affecting users viewing videos.

Among them, the background sound may be the ambient sound in a scene in which the target video is captured, such as wind sound, whistle sound, etc., and may also be the music added during a video editing process.

In addition, in order to improve the excessive suppression of background sound, when the background sound is small enough, the target video can be played based on the original audio data of the original video to ensure the user's video viewing experience.

In the video playing method provided by embodiments of the present disclosure, first in response to a trigger operation on a preset background sound softening control, starting a preset background sound softening mode; then in response to starting of the preset background sound softening mode, triggering a background sound softening process for at least one original video, and acquiring a target video corresponding to the original video based on the background sound softening process; wherein the target video includes background sound softening-result audio data, and the background sound softening-result audio data is obtained by processing original audio data of the original video based on a trained background sound softening model; and then playing the target video based on the background sound softening-result audio data. The present disclosure can enter a preset background sound softening mode by a user triggering a preset background sound softening control, in this mode, the original audio data of the original video is processed to obtain background sound softened video data, and then the target video is played based on the background sound softened video data, so that the intensity of the background sound can be changed at any time according to the user's needs, thereby solving the problem of people's video viewing experience being affected due to excessive background sound.

Figure 7:
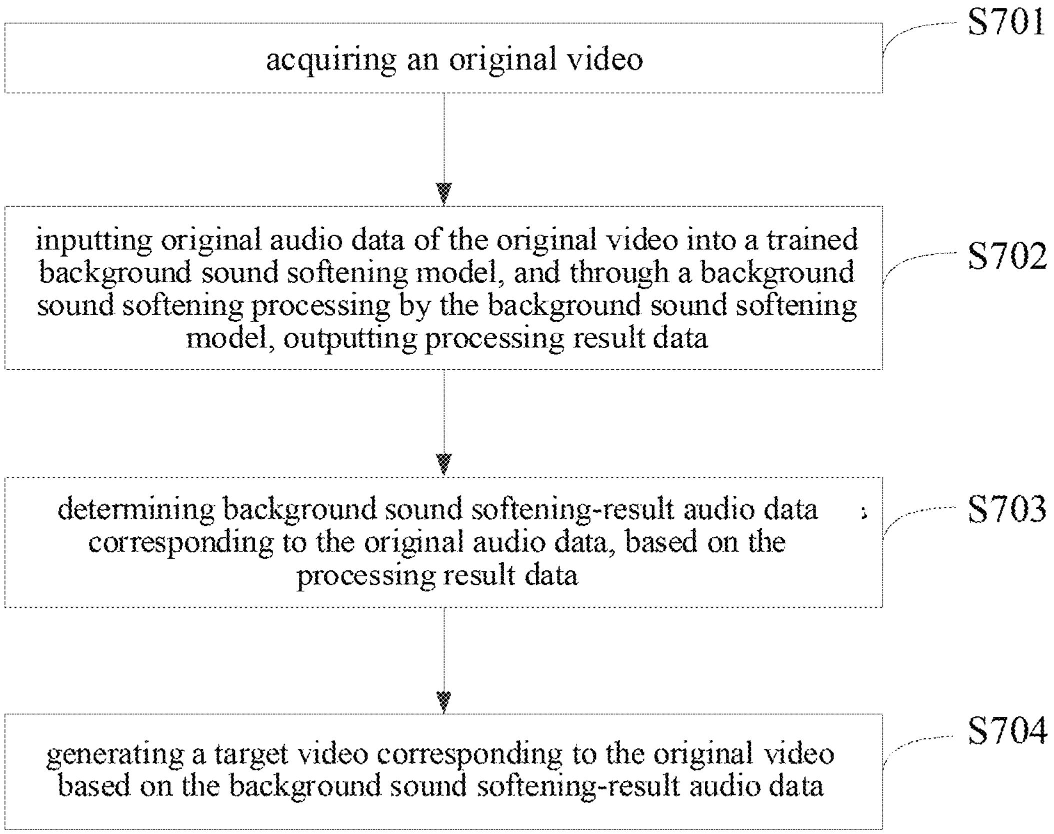
FIG. 7 is a flow chart of another video playing method provided by an embodiment of the present disclosure.

In order to facilitate further understanding of a video playing method provided by an embodiment of the present disclosure, an embodiment of the present disclosure further provides a video playing method, referring to FIG. 7 which is a flowchart of another video playing method provided by an embodiment of the present disclosure, the method is appliable on a server side, and the method may include:

S701: acquiring an original video.

In an embodiment of the present disclosure, the server side can acquire an original video based on the original video carrying a background sound softening identifier sent from a client side.

Among them, the server may be a laptop computer, a desktop computer, a server or a server cluster, or the like.

S702: inputting original audio data of the original video into a trained background sound softening model, and through a background sound softening processing by the background sound softening model, outputting processing result data.

In an embodiment of the present disclosure, it is assumed that the original audio data of the original video is a mixture of vocal audio data and background environmental audio data, the original audio data of the original video is input into a trained background sound softening model, and through processing by the background sound softening model, the processing result data is output, wherein the processing result data only contains the vocal audio data in the original audio data of the original video.

S703: determining background sound softening-result audio data corresponding to the original audio data, based on the processing result data.

In an embodiment of the present disclosure, the background sound softening-result audio data corresponding to the original audio data is audio data containing only vocal voice through the background sound softening processing by the background sound softening model.

S704: generating a target video corresponding to the original video based on the background sound softening-result audio data.

In order to meet users' different video viewing requirements, some background sounds can be incorporated, without affecting users viewing videos, in an optional implementation, the processing result data can be mixed with the original audio data of the original video according to a preset first ratio, to obtain a first mixing result audio data, and the first mixing result audio data can be determined as the background sound softening-result audio data corresponding to the original audio data.

Among them, the preset first ratio may be set as required, which is not limited in any way in the present disclosure.

In an embodiment of the present disclosure, assuming that the preset first ratio is a:b, after the processing result data is obtained, the processing result data can be mixed with the original audio data of the original video according to a:b to obtain first mixing result audio data, and the first mixing result audio data can be determined as the background sound softening-result audio data corresponding to the original audio data.

Specifically, the first mixing result audio data includes $$\frac{a}{a+b}$$

of the processing result data and $$\frac{b}{a+b}$$

of the original audio data of the original video, wherein the original audio data of the original video includes vocal audio data and background audio data. Therefore, through calculation, it can be concluded that the first mixing result audio data is a mixture of vocal audio data and $$\frac{b}{a+b}$$

of background audio data.

In another optional implementation, based on the original audio data of the original video and the processing result data, the background audio data in the original audio data can be acquired, and the processing result data and the background audio data can be mixed according to a preset second ratio to obtain second mixing result audio data, and the second mixing result audio data can be determined as the background sound softening-result audio data corresponding to the original audio data.

Among them, the preset second ratio may be set as required, which is not limited in any way in the present disclosure.

In an embodiment of the present disclosure, assuming that the preset second ratio is c:d, after the processing result data is obtained based on the trained background sound softening model, the background audio data in the original audio data can be acquired based on the original audio data of the original video and the processing result data, the processing result data can be mixed with the original audio data of the original video according to c:d to obtain the second mixing result audio data, and the first mixing result audio data can be determined as the background sound softening-result audio data corresponding to the original audio data.

Specifically, the second mixing result data includes mixed audio data of $$\frac{c}{c+d}$$

of the processing result data and $$\frac{d}{c+d}$$

of the background audio data.

In order to improve the excessive suppression of background sound and ensure the user's video viewing experience, it is also possible to judge whether to play the target video based on the original audio data of the original video according to an energy ratio between the processing result data and the original audio data of the original video, the energy value of the background audio data, or the like.

In an optional implementation, the energy ratio between the processing result data and the original audio time of the original video can be first determined, in response to the energy ratio being greater than a preset third ratio, the original audio data of the original video is determined as the background sound softening-result audio data corresponding to the original audio data, in response to the energy ratio being not greater than the preset third ratio, the processing result data is determined as the background sound softening-result audio data corresponding to the original audio data.

Among them, the preset third ratio may be set as required, which is not limited in any way in the present disclosure.

In an embodiment of the present disclosure, the energy ratio between the processing result data and the original audio data of the original video can be first determined, in response to the energy ratio being greater than the preset third ratio, which indicates that the background sound has little effect on the video viewing, therefore, the original audio data of the original video can be directly determined as the background sound softening-result audio data corresponding to the original audio data, without any adjustment, in response to the energy ratio being not greater than the preset third ratio, that is, less than or equal to the preset third ratio, which indicates that the background sound needs to be softened, and the processing result data can be determined as the background sound softening-result audio data corresponding to the original audio data.

In another optional implementation, the background audio data in the original audio data can be first determined based on the processing result data and the original audio data of the original video, and then it is determined whether the energy value of the background audio data is less than a preset energy threshold, in response to the energy value being less than the preset energy threshold, the original audio data of the original video is determined as the background sound softening-result audio data corresponding to the original audio data, in response to the energy value being not less than the preset energy threshold, the processing result data is determined as the background sound softening-result audio data corresponding to the original audio data.

Among them, the preset energy threshold may be set as required, which is not limited in any way in the present disclosure.

In an embodiment of the present disclosure, the background audio data in the original audio data can be first determined based on the processing result data and the original audio data of the original video, and then it is determined whether an energy value of the background audio data is less than a preset energy threshold, in response to the energy value being less than the preset energy threshold, which indicates that the background sound is small enough, therefore, the original audio data of the original video can be directly determined as the background sound softening-result audio data corresponding to the original audio data, without any adjustment, in response to the energy value being not less than the preset energy threshold, that is, greater than or equal to the preset energy threshold, which indicates that the background sound is large and needs to be softened, then the processing result data can be determined as the background sound softening-result audio data corresponding to the original audio data.

In the video playing method provided by the embodiment of the present disclosure, first acquiring an original video, inputting original audio data of the original video into a trained background sound softening model, and through a background sound softening processing by the background sound softening model, outputting processing result data, then determining background sound softening-result audio data corresponding to the original audio data, based on the processing result data, and then generating a target video corresponding to the original video based on the background sound softening-result audio data. The present disclosure can obtain the background sound softening-result audio data corresponding to the original audio data by inputting the original audio data of the original video into a trained background sound softening model for processing, and then generating a target video corresponding to the original video based on the background sound softening-result audio data, so that the user, after starting the preset background sound softening mode, can play the target video based on the background sound softening-result audio data corresponding to the original audio data, thereby improving the user's viewing experience.

In order to facilitate further understanding of the video playing method provided by embodiments of the present disclosure, an embodiment of the present disclosure further provides a method for training a background sound softening model, which is appliable to a model training server. The model training server can be the same as the server deployed on the above-mentioned server side, or it can be a different server.

Figure 8:
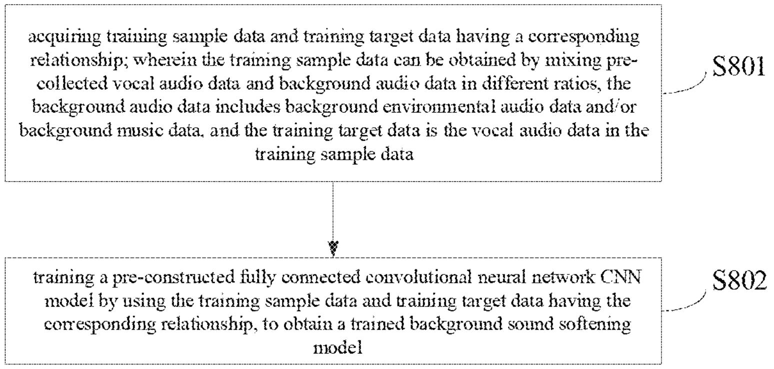
FIG. 8 is a flow chart of a method for training a background sound softening model provided by an embodiment of the present disclosure.

Referring to FIG. 8, which is a flow chart of a method for training a background sound softening model provided by an embodiment of the present disclosure, the method includes:

S801: acquiring training sample data and training target data having a corresponding relationship, wherein the training sample data can be obtained by mixing pre-collected vocal audio data and background audio data in different ratios, the background audio data includes background environmental audio data and/or background music data, and the training target data is the vocal audio data in the training sample data.

Specifically, the background environmental audio data refers to ambient sound in a scene in which the target video is captured, such as wind sound, whistle sound, etc., and the background music data can be pure accompaniment data, or pure music data, etc., which usually means music data added during the video editing process.

S802: training a pre-constructed fully connected convolutional neural network CNN model by using the training sample data and training target data having the corresponding relationship, to obtain a trained background sound softening model.

Among them, the training sample data and the training target data have a corresponding relationship, for example, the training sample data may be data obtained by mixing vocal audio data and environmental audio data in a ratio of 5:1, and the training target data is the vocal audio data in the training sample data.

In an embodiment of the present disclosure, the training sample data and the training target data are used to train a pre-constructed fully connected convolutional neural network CNN model, thereby obtaining a trained background sound softening model, specifically, performing audio feature extraction on the training sample data, the audio feature may be such as amplitude spectrum feature, logarithmic spectrum feature, etc., and then inputting the extracted audio features into the pre-constructed CNN model to obtain estimated vocal audio data, then calculating a loss function by using the estimated vocal audio data and the training target data, i.e., the vocal audio data in the training sample data, thereby completing one round of training for the pre-constructed CNN model, after performing multiple rounds of training for the CNN model by using a large amount of training sample data in the above manner, when it is determined that a convergence result of the loss function between the estimated vocal audio data and the corresponding training target data meets the model training requirements, the trained background sound softening model can be obtained.

Among them, since the CNN model supports parallel computing, the background sound softening model trained based on the CNN model can perform background sound softening processing on the original audio data in the target video more quickly, thereby improving the processing efficiency of background sound softening.

Figure 9:
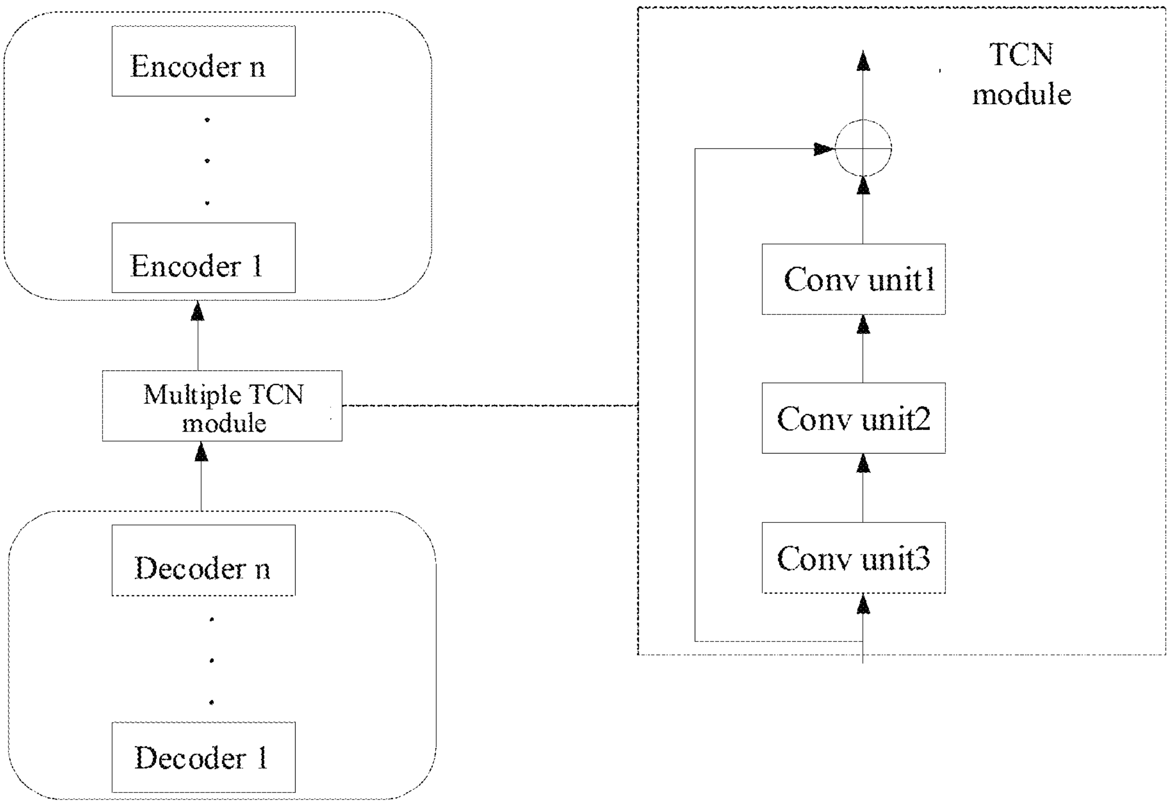
FIG. 9 is a schematic diagram of a network model provided by an embodiment of the present disclosure.

In order to more clearly understand the pre-constructed fully connected convolutional neural network CNN model, referring to FIG. 9, which is a schematic diagram of a network model provided for an embodiment of the present disclosure, as shown in FIG. 9, the model adopts an encoder-TCN (Temporal Convolutional Network) module-decoder structure, wherein each TCN module is composed of three one-dimensional causal dilated convolution units with different parameters, that is. Conv unit1. Conv unit2, and Conv unit3 as shown in FIG. 9 correspond to one-dimensional causal dilated convolution units with different parameters, respectively.

It should be noted that the embodiments of the present disclosure do not impose any restrictions on the number of CNN convolutional layers.

In the method for training the background sound softening model provided by the embodiment of the present disclosure, firstly, acquiring training sample data and training target data having a corresponding relationship: wherein the training sample data can be obtained by mixing pre-collected vocal audio data and background audio data in different ratios, the background audio data includes background environmental audio data and/or background music data, and the training target data is the vocal audio data in the training sample data; then training a pre-constructed fully connected convolutional neural network CNN model by using the training sample data and training target data having the corresponding relationship, to obtain a trained background sound softening model. The present disclosure can obtain a trained background sound softening model by training a pre-constructed fully connected convolutional neural network CNN model using training sample data and training target data having a corresponding relationship, since the training sample data is obtained by mixing pre-collected vocal audio data and background audio data in different ratios, the training sample data is richer, thereby improving the accuracy of the background sound softening model, in addition, since the CNN model supports parallel computing, the background sound softening model trained based on the CNN model can perform background sound softening processing on the original audio data in the target video more quickly, thereby improving the processing efficiency of background sound softening.

Figure 10:
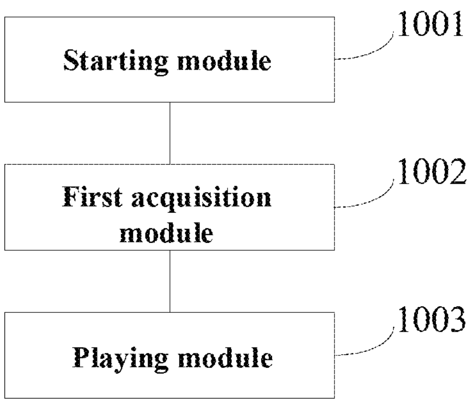
FIG. 10 is a schematic structural diagram of a video playing apparatus provided by an embodiment of the present disclosure.

Based on the above method embodiments, the present disclosure further provides a video playing apparatus, referring to FIG. 10, which is a schematic structural diagram of a video playing apparatus provided by an embodiment of the present disclosure, and the device includes:

a starting module 1001 configured to, in response to a trigger operation on a preset background sound softening control, start a preset background sound softening mode;

a first acquisition module 1002 configured to, in response to starting of the preset background sound softening mode, trigger a background sound softening process for at least one original video, and acquire a target video corresponding to the original video based on the background sound softening process; wherein the target video includes background sound softening-result audio data, and the background sound softening-result audio data is obtained by processing original audio data of the original video based on a trained background sound softening model; and a playing module 1003 configured to play the target video based on the background sound softening-result audio data.

In an optional implementation, the opening module may be specifically configured to:

in response to a triggering operation on a preset background sound softening control on a video playing setting interface, start a preset background sound softening mode.

In an optional implementation, the apparatus may further include:

A first display module configured to, display a background sound softening mode guide window on the video playing interface: wherein a mode starting control is disposed on the background sound softening mode guide window:

A second display module configured to, in response to a trigger operation on the mode starting control, displaying a video playing setting interface: wherein a preset background sound softening control is disposed on the video playing setting interface.

In an optional implementation, the starting module may be specifically configured to:

in response to a triggering operation on a preset background sound softening control on a playing interface for the first video, start a preset background sound softening mode.

In an optional implementation, the starting module may be specifically configured to:

in response to a triggering operation on a preset background sound softening control on a playing interface for the first video in a clear screen state, start a preset background sound softening mode.

In an optional implementation, the apparatus may further include:

a first determination module configured to, receive a softening degree adjustment operation on a preset softening adjustment control, and determine a softening degree adjustment result based on the softening degree adjustment operation:

Correspondingly, the starting module may be specifically configured to:

in response to a triggering operation on a preset background sound softening control, start a preset background sound softening mode based on the softening degree adjustment result.

In the video playing apparatus provided by embodiments of the present disclosure, first in response to a trigger operation on a preset background sound softening control, starting a preset background sound softening mode; then in response to starting of the preset background sound softening mode, triggering a background sound softening process for at least one original video, and acquiring a target video corresponding to the original video based on the background sound softening process; wherein the target video includes background sound softening-result audio data, and the background sound softening-result audio data is obtained by processing original audio data of the original video based on a trained background sound softening model; and then playing the target video based on the background sound softening-result audio data. The present disclosure can enter a preset background sound softening mode by a user triggering a preset background sound softening control, in this mode, the original audio data of the original video is processed to obtain background sound softened video data, and then the target video is played based on the background sound softened video data, so that the intensity of the background sound can be changed at any time according to the user's needs, thereby solving the problem of people's video viewing experience being affected due to excessive background sound.

Figure 11:
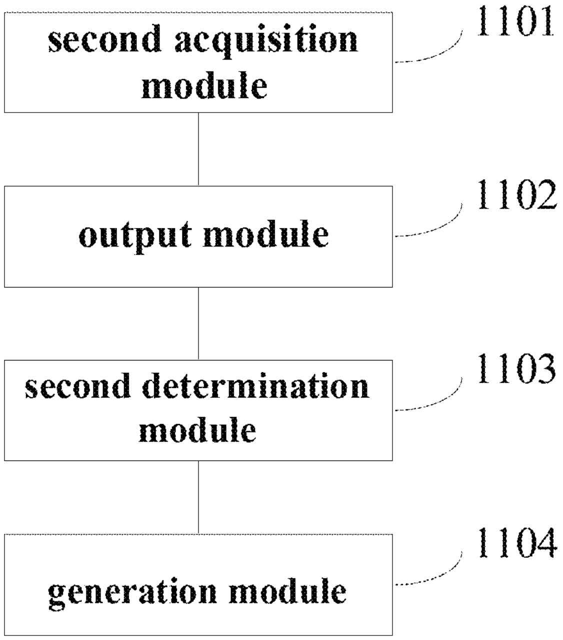
FIG. 11 is a schematic structural diagram of another video playing apparatus provided by an embodiment of the present disclosure.

Additionally, the present disclosure further provides a video playing apparatus. Referring to FIG. 11, which is a schematic structural diagram of another video playing apparatus provided by an embodiment of the present disclosure. The apparatus includes:

a second acquisition module 1101 configured to acquire an original video;

an output module 1102 configured to input original audio data of the original video into a trained background sound softening model, and through a background sound softening processing by the background sound softening model, output processing result data;

a second determination module 1103 configured to determine background sound softening-result audio data corresponding to the original audio data, based on the processing result data;

a generation module 1104 configured to generate a target video corresponding to the original video based on the background sound softening-result audio data.

In an optional implementation, the apparatus may further include:

a first mixing module, configured to mix the processing result data with the original audio data of the original video according to a preset first ratio to obtain first mixing result audio data; Accordingly, the second determination module may be specifically configured to:

determine the first mixing result audio data as the background sound softening-result audio data corresponding to the original audio data.

In an optional implementation, the device may further include:

a third acquisition module, configured to acquire background audio data in the original audio data based on the original audio data of the original video and the processing result data;

a second mixing module, configured to mix the processing result data with the background audio data according to a preset second ratio to obtain second mixing result audio data;

Accordingly, the second determination module may be specifically configured to:

determine the second mixing result audio data as the background sound softening-result audio data corresponding to the original audio data.

In an optional implementation, the apparatus may further include:

a third determination module, configured to determine an energy ratio between the processing result data and the original audio data of the original video;

a fourth determination module, configured to, in response to the energy ratio being greater than a preset third ratio, determine the original audio data of the original video as the background sound softening-result audio data:

Accordingly, the second determination module may be specifically configured to:

in response to the energy ratio being not greater than the preset third ratio, determine the processing result data as the background sound softening-result audio data corresponding to the original audio data.

In an optional implementation, the apparatus may further include:

a fifth determination module, configured to determine background audio data in the original audio data based on the processing result data and the original audio data of the original video;

a sixth determination module, configured to determine whether an energy value of the background audio data is less than a preset energy threshold;

a seventh determination module, configured to, in response to the energy value being less than the preset energy threshold, determine the original audio data of the original video as the background sound softening-result audio data corresponding to the original audio data:

Accordingly, the second determination module may be specifically configured to:

in response to the energy value being not less than the preset energy threshold, determine the processing result data as the background sound softening-result audio data corresponding to the original audio data.

In the video playing apparatus provided by the embodiment of the present disclosure, first acquiring an original video, inputting original audio data of the original video into a trained background sound softening model, and through a background sound softening processing by the background sound softening model, outputting processing result data, then determining background sound softening-result audio data corresponding to the original audio data, based on the processing result data, and then generating a target video corresponding to the original video based on the background sound softening-result audio data. The present disclosure can obtain the background sound softening-result audio data corresponding to the original audio data by inputting the original audio data of the original video into a trained background sound softening model for processing, and then generating a target video corresponding to the original video based on the background sound softening-result audio data, so that the user, after starting the preset background sound softening mode, can play the target video based on the background sound softening-result audio data corresponding to the original audio data, thereby improving the user's viewing experience.

Figure 12:
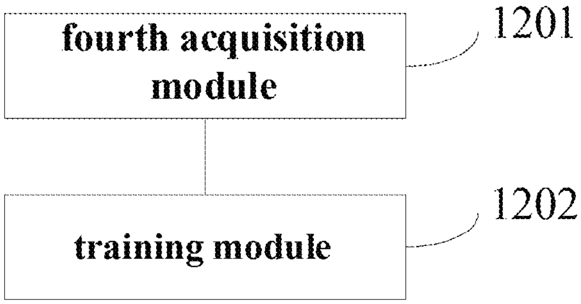
FIG. 12 is a schematic structural diagram of an apparatus for training a background sound softening model provided by an embodiment of the present disclosure.

Additionally, the present disclosure further provides a video playing apparatus, referring to FIG. 12, which is a schematic structural diagram of an apparatus for training a background sound softening model provided by an embodiment of the present disclosure, the apparatus includes:

a fourth acquisition module 1201 configured to acquire training sample data and training target data having a corresponding relationship: wherein the training sample data can be obtained by mixing pre-collected vocal audio data and background audio data in different ratios, the background audio data includes background environmental audio data and/or background music data, and the training target data is the vocal audio data in the training sample data;

a training module 1202 configured to train a pre-constructed fully connected convolutional neural network CNN model by using the training sample data and training target data having the corresponding relationship, to obtain a trained background sound softening model.

In the apparatus for training the background sound softening model provided by the embodiment of the present disclosure, firstly, acquiring training sample data and training target data having a corresponding relationship: wherein the training sample data can be obtained by mixing pre-collected vocal audio data and background audio data in different ratios, the background audio data includes background environmental audio data and/or background music data, and the training target data is the vocal audio data in the training sample data; then training a pre-constructed fully connected convolutional neural network CNN model by using the training sample data and training target data having the corresponding relationship, to obtain a trained background sound softening model. The present disclosure can obtain a trained background sound softening model by training a pre-constructed fully connected convolutional neural network CNN model using training sample data and training target data having a corresponding relationship, since the training sample data is obtained by mixing pre-collected vocal audio data and background audio data in different ratios, the training sample data is richer, thereby improving the accuracy of the background sound softening model, in addition, since the CNN model supports parallel computing, the background sound softening model trained based on the CNN model can perform background sound softening processing on the original audio data in the target video more quickly, thereby improving the processing efficiency of background sound softening.

In addition to the above-mentioned methods and apparatuses, the embodiments of the present disclosure further provide a computer-readable storage medium storing instructions therein, the instructions, when executed on a terminal device, cause the terminal device to implement the video playing method described in the embodiments of the present disclosure.

The embodiments of the present disclosure further provide a computer program product, which includes computer programs/instructions which, when executed by a processor, cause the video playing method described in the embodiments of the present disclosure to be implemented.

Figure 13:
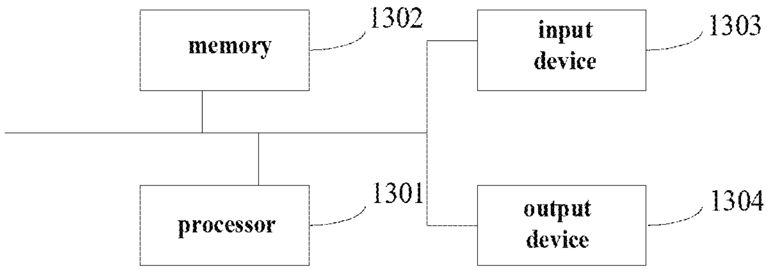
FIG. 13 is a schematic structural diagram of a video playing device provided by an embodiment of the present disclosure.

In addition, the embodiments of the present disclosure further provide a video playing device, as shown in FIG. 13, which may include:

a processor 1301, a memory 1302, an input device 1303, and an output device 1304. The number of processors 901 in the video playing device can be one or more, and FIG. 13 takes one processor as an example.

In some embodiments of the present disclosure, the processor 1301, the memory 1302, the input device 1303 and the output device 1304 may be connected via a bus or other means, wherein FIG. 13 takes connection via a bus as an example.

The memory 1302 may be used to store software programs and modules, the processor 1301 executes various functional applications and data processing of the video playing device by running the software programs and modules stored in the memory 1302. The memory 1302 may mainly include a program storage area and a data storage area, wherein the program storage area may store an operating system, an application program required for at least one function, and the like. In addition, the memory 1302 may include a high-speed random-access memory, and may also include a non-volatile memory, such as at least one disk storage device, a flash memory device, or other volatile solid-state storage devices. The input device 1303 may be used to receive input digital or character information, and to generate signal input related to user settings and function control of the video playing device.

Specifically, in the embodiment, the processor 1301 will load executable files corresponding to the processes of one or more applications into the memory 1302 according to instructions, and the processor 1301 will run the applications stored in the memory 1302, thereby realizing various functions of the above-mentioned video playing device.

It should be noted that, in this document, relational terms such as "first" and "second" are merely used to distinguish one entity or operation from another entity or operation, and do not necessarily require or imply any actual relationship or order between these entities or operations. Furthermore, the terms "comprise," "include," or any other variations thereof are intended to cover non-exclusive inclusion, such that a process, method, article, or apparatus that may include a list of elements includes not only those elements but also other elements not expressly listed, or may also include elements inherent to such process, method, article, or apparatus.

Without more limitations, an element defined by the phrase "comprising a . . . " does not exclude a case that there may exist other identical elements in the process, method, article or apparatus comprising the element.

The above description is only specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the disclosure. Thus, the present disclosure will not be limited to the embodiments described herein, but is to be accorded the widest scope consistent with the principles and novel features disclosed herein.

What is claimed is:

1. A video playing method, comprising:

in response to a trigger operation on a preset background sound softening control, starting a preset background sound softening mode;

in response to starting of the preset background sound softening mode, triggering a background sound softening process for at least one original video, and acquiring a target video corresponding to the original video based on the background sound softening process;

wherein the target video includes background sound softening-result audio data;

wherein the background sound softening process comprises processing original audio data of the original video based on a trained background sound softening model to obtain processing result data, and determining the background sound softening-result audio data corresponding to the original audio data, based on the processing result data; and playing the target video based on the background sound softening-result audio data;

wherein the determining the background sound softening-result audio data corresponding to the original audio data, based on the processing result data comprises:

in response to an energy ratio between the processing result data and the original audio data of the original video being greater than a preset third ratio, determining the original audio data of the original video as the background sound softening-result audio data.

2. The method of claim 1, wherein, in response to the trigger operation on the preset background sound softening control, starting the preset background sound softening mode, comprises:

in response to the trigger operation on the preset background sound softening control on a video playing setting interface, starting the preset background sound softening mode.

3. The method of claim 2, wherein, before in response to the triggering operation on the preset background sound softening control on the video playing setting interface, starting the preset background sound softening mode, the method further comprises:

displaying a background sound softening mode guide window on the video playing interface;

wherein a mode starting control is disposed on the background sound softening mode guide window;

in response to a trigger operation on the mode starting control, displaying the video playing setting interface;

wherein the preset background sound softening control is disposed on the video playing setting interface.

4. The method of claim 1, wherein, in response to the trigger operation on the preset background sound softening control, starting the preset background sound softening mode, comprises:

in response to the triggering operation on the preset background sound softening control on a playing interface for a first video, starting the preset background sound softening mode.

5. The method of claim 4, wherein, in response to the triggering operation on the preset background sound softening control on the playing interface for the first video, starting the preset background sound softening mode, comprises:

in response to the triggering operation on the preset background sound softening control on the playing interface for the first video in a clear screen state, starting the preset background sound softening mode.

6. The method of claim 1, wherein, before in response to the trigger operation on the preset background sound softening control, starting the preset background sound softening mode, the method further comprises:

receiving a softening degree adjustment operation on a preset softening adjustment control, and determining a softening degree adjustment result based on the softening degree adjustment operation; and correspondingly, in response to the trigger operation on the preset background sound softening control, starting the preset background sound softening mode, comprises:

in response to the triggering operation on the preset background sound softening control, starting the preset background sound softening mode based on the softening degree adjustment result.

7. The method of claim 1, wherein, the acquiring the target video corresponding to the original video based on the background sound softening process, comprises:

inputting the original audio data of the original video into the trained background sound softening model, and through a background sound softening processing by the trained background sound softening model, outputting the processing result data;

generating the target video corresponding to the original video based on the background sound softening-result audio data.

8. The method of claim 7, wherein, before determining the background sound softening-result audio data corresponding to the original audio data, based on the processing result data, the method further comprises:

mixing the processing result data with the original audio data of the original video in accordance with a preset first ratio, to obtain first mixing result audio data; and correspondingly, the determining background sound softening-result audio data corresponding to the original audio data, based on the processing result data, comprises:

determining the first mixing result audio data as the background sound softening-result audio data corresponding to the original audio data.

9. The method of claim 7, wherein, before the determining background sound softening-result audio data corresponding to the original audio data, based on the processing result data, the method further comprises:

based on the original audio data of the original video and the processing result data, acquiring background audio data in the original audio data;

mixing the processing result data with the background audio data in accordance with a preset second ratio to obtain second mixing result audio data;

correspondingly, the determining softening-result audio data corresponding to the original audio data, based on the processing result data, comprises:

determining the second mixing result audio data as the background sound softening-result audio data corresponding to the original audio data.

10. The method of claim 7, wherein, after the inputting original audio data of the original video into the trained background sound softening model, and through the background sound softening processing by the background sound softening model, outputting the processing result data, the method further comprises:

determining the energy ratio between the processing result data and the original audio data of the original video.

11. The method of claim 10, wherein, the determining the background sound softening-result audio data corresponding to the original audio data based on the processing result data, comprises:

in response to the energy ratio being not greater than the preset third ratio, determining the processing result data as the background sound softening-result audio data corresponding to the original audio data.

12. The method of claim 7, wherein, after the inputting audio data of the target video into the trained background sound softening model, and through the background sound softening processing by the background sound softening model, outputting the processing result data, the method further comprises:

determining background audio data in the original audio data, based on the processing result data and the original audio data of the original video;

determining whether an energy value of the background audio data is less than a preset energy threshold;

in response to the energy value being less than the preset energy threshold, then determining the original audio data of the original video as the background sound softening-result audio data corresponding to the original audio data; and correspondingly, the determining the background sound softening-result audio data corresponding to the original audio data based on the processing result data, comprises:

in response to the energy value being not less than the preset energy threshold, determining the processing result data as the background sound softening-result audio data corresponding to the original audio data.

13. The method of claim 1, wherein the background sound softening model is trained by:

acquiring training sample data and training target data having a corresponding relationship;

wherein the training sample data can be obtained by mixing pre-collected vocal audio data and background audio data in different ratios, the background audio data includes background environmental audio data and/or background music data, and the training target data is the vocal audio data in the training sample data;

training a pre-constructed fully connected convolutional neural network CNN model by using the training sample data and the training target data having the corresponding relationship, to obtain the trained background sound softening model.

14. A non-transitory computer-readable storage medium having instructions stored thereon, which, when executed on a terminal device, causes the terminal device to implement:

in response to a trigger operation on a preset background sound softening control, starting a preset background sound softening mode;

in response to starting of the preset background sound softening mode, triggering a background sound softening process for at least one original video, and acquiring a target video corresponding to the original video based on the background sound softening process; wherein the target video includes background sound softening-result audio data, wherein the background sound softening process comprises processing original audio data of the original video based on a trained background sound softening model to obtain processing result data, and determining the background sound softening-result audio data corresponding to the original audio data, based on the processing result data; and playing the target video based on the background sound softening-result audio data, wherein the determining the background sound softening-result audio data corresponding to the original audio data, based on the processing result data comprises:

in response to an energy ratio between the processing result data and the original audio data of the original video being greater than a preset third ratio, determining the original audio data of the original video as the background sound softening-result audio data.

15. A video playing device, including a memory storing computer programs, a processor, where the processor, when executing the computer programs, implements:

in response to a trigger operation on a preset background sound softening control, starting a preset background sound softening mode;

in response to starting of the preset background sound softening mode, triggering a background sound softening process for at least one original video, and acquiring a target video corresponding to the original video based on the background sound softening process; wherein the target video includes background sound softening-result audio data, wherein the background sound softening process comprises processing original audio data of the original video based on a trained background sound softening model to obtain processing result data, and determining the background sound softening-result audio data corresponding to the original audio data, based on the processing result data; and playing the target video based on the background sound softening-result audio data, wherein the determining the background sound softening-result audio data corresponding to the original audio data, based on the processing result data comprises:

in response to an energy ratio between the processing result data and the original audio data of the original video being greater than a preset third ratio, determining the original audio data of the original video as the background sound softening-result audio data.

16. The non-transitory computer-readable storage medium of claim 14, wherein, in response to the trigger operation on the preset background sound softening control, starting the preset background sound softening mode, comprises:

in response to the trigger operation on the preset background sound softening control which is located on at least one of a video playing setting interface or a playing interface for a first video, starting the preset background sound softening mode.

17. The non-transitory computer-readable storage medium of claim 14, wherein, before in response to the trigger operation on the preset background sound softening control, starting the preset background sound softening mode, the instructions when executed on the terminal device, causes the terminal device to further implement:

receiving a softening degree adjustment operation on a preset softening adjustment control, and determining a softening degree adjustment result based on the softening degree adjustment operation; and correspondingly, in response to the trigger operation on the preset background sound softening control, starting the preset background sound softening mode, comprises:

in response to the triggering operation on the preset background sound softening control, starting the preset background sound softening mode based on the softening degree adjustment result.

18. The non-transitory computer-readable storage medium of claim 14, wherein, the acquiring the target video corresponding to the original video based on the background sound softening process, comprises:

inputting the original audio data of the original video into the trained background sound softening model, and through a background sound softening processing by the background sound softening model, outputting the processing result data;

determining the background sound softening-result audio data corresponding to the original audio data, based on the processing result data;

generating the target video corresponding to the original video based on the background sound softening-result audio data.

19. The video playing device of claim 15, wherein, in response to the trigger operation on the preset background sound softening control, starting the preset background sound softening mode, comprises:

in response to the trigger operation on the preset background sound softening control which is located on at least one of a video playing setting interface or a playing interface for a first video, starting the preset background sound softening mode.

20. The video playing device of claim 15, wherein, before in response to the trigger operation on the preset background sound softening control, starting the preset background sound softening mode, the processor, when executing the computer programs, further implements:

receiving a softening degree adjustment operation on a preset softening adjustment control, and determining a softening degree adjustment result based on the softening degree adjustment operation; and correspondingly, in response to the trigger operation on the preset background sound softening control, starting the preset background sound softening mode, comprises:

in response to the trigger operation on the preset background sound softening control, starting the preset background sound softening mode based on the softening degree adjustment result.

* * * * *